US012775677B2

(12) United States Patent
Dent et al.

(10) Patent No.: US 12,775,677 B2
(45) Date of Patent: Oct. 27, 2026

(54) N-POINT COMPLEX FOURIER TRANSFORM STRUCTURE HAVING ONLY 2N REAL MULTIPLIES, AND OTHER MATRIX MULTIPLY OPERATIONS

(71) Applicant: UHNDER, INC., Austin, TX (US)

(72) Inventors: Paul W. Dent, Pittsboro, NC (US); Frederick Rush, Auburn, AL (US); Monier Maher, St. Louis, MO (US)

(73) Assignee: Robert Bosch GmbH, Gerlingen (DE)

( * ) Notice: Subject to any disclaimer, the term of this patent is extended or adjusted under 35 U.S.C. 154(b) by 1218 days.

(21) Appl. No.: 17/582,359

(22) Filed: Jan. 24, 2022

(65) Prior Publication Data

US 2022/0398295 A1 Dec. 15, 2022

Related U.S. Application Data

(60) Provisional application No. 63/140,567, filed on Jan. 22, 2021.

(51) Int. Cl.
*G06F 17/16* (2006.01)
*G01S 7/02* (2006.01)
(Continued)

(52) U.S. Cl.
CPC .............. *G06F 17/16* (2013.01); *G01S 7/023* (2013.01); *G01S 7/0231* (2021.05);
(Continued)

(58) Field of Classification Search
CPC ................................................. G06F 17/14–16
See application file for complete search history.

(56) References Cited

U.S. PATENT DOCUMENTS 1,882,128 A 10/1932 Fearing
3,374,478 A 3/1968 Blau
(Continued)

FOREIGN PATENT DOCUMENTS

EP 0509843 10/1992
EP 1826586 8/2007
(Continued)

OTHER PUBLICATIONS

Chambers et al., An article entitled "Real-Time Vehicle Mounted Multistatic Ground Penetrating Radar Imaging System for Buried Object Detection," Lawrence Livermore National Laboratory Reports (LLNL-TR-615452), Feb. 4, 2013; Retrieved from the Internet from https://e-reports-ext.llnl.gov/pdf/711892.pdf.
(Continued)

*Primary Examiner* — Carlo Waje
(74) *Attorney, Agent, or Firm* — Gardner, Linn, Burkhart & Ondersma LLP

(57) ABSTRACT

An integrated circuit chip implementing multiplication of an M×N element matrix with an N-element vector to obtain an M-element product by combining the vector with rows of bits of the same significance selected from the matrix one bit-row at a time to form partial products, exploiting the fact that the same potential combinations are needed for all bit-rows and all matrix rows to precompute all of the combinations once and for all, and combining selected partial products for different bit place-significance with a shift-and-add operation only once for each of the M product elements, thereby effectively using only M multiply-equivalent structures. An N-point Complex Fourier Transform can therefore be claimed which only needs 2N real multiplies and the product of an N×N matrix with another N×N matrix requires only $N^2$ multiplies.

16 Claims, 9 Drawing Sheets

Hardware to form the first product Ro

(51) Int. Cl.

| | |
|---|---|
| ***G01S 7/28*** | (2006.01) |
| ***G01S 7/35*** | (2006.01) |
| ***G01S 7/40*** | (2006.01) |
| ***G06F 7/48*** | (2006.01) |
| ***G06F 17/14*** | (2006.01) |
| ***H04B 1/00*** | (2006.01) |
| ***H04B 1/10*** | (2006.01) |
| *G01S 13/931* | (2020.01) |

(52) U.S. Cl.

CPC .......... *G01S 7/0232* (2021.05); *G01S 7/0234* (2021.05); *G01S 7/0236* (2021.05); *G01S 7/2813* (2013.01); *G01S 7/354* (2013.01); *G01S 7/358* (2021.05); *G01S 7/4004* (2013.01); *G06F 7/4812* (2013.01); *G06F 17/141* (2013.01); *H04B 1/0057* (2013.01); *H04B 1/1081* (2013.01); *G01S 13/931* (2013.01)

(56) References Cited

U.S. PATENT DOCUMENTS

| | | | | |
|---|---|---|---|---|
| 3,735,398 | A | 5/1973 | Ross | |
| 3,750,169 | A | 7/1973 | Strenglein | |
| 3,766,554 | A | 10/1973 | Tresselt | |
| 3,896,434 | A | 7/1975 | Sirven | |
| 3,932,871 | A | 1/1976 | Foote | |
| 4,078,234 | A | 3/1978 | Fishbein et al. | |
| 4,176,351 | A | 11/1979 | De Vita et al. | |
| 4,308,536 | A | 12/1981 | Sims, Jr. et al. | |
| 4,566,010 | A | 1/1986 | Collins | |
| 4,612,547 | A | 9/1986 | Itoh | |
| 4,882,668 | A | 11/1989 | Schmid et al. | |
| 4,910,464 | A | 3/1990 | Trett et al. | |
| 4,939,685 | A | 7/1990 | Feintuch | |
| 5,001,486 | A | 3/1991 | Bächtiger | |
| 5,012,254 | A | 4/1991 | Thompson | |
| 5,034,906 | A | 7/1991 | Chang | |
| 5,087,918 | A | 2/1992 | May et al. | |
| 5,151,702 | A | 9/1992 | Urkowitz | |
| 5,175,710 | A | 12/1992 | Hutson | |
| 5,218,619 | A | 6/1993 | Dent | |
| 5,272,663 | A | 12/1993 | Jones et al. | |
| 5,280,288 | A | 1/1994 | Sherry et al. | |
| 5,302,956 | A | 4/1994 | Asbury et al. | |
| 5,341,141 | A | 8/1994 | Frazier et al. | |
| 5,345,470 | A | 9/1994 | Alexander | |
| 5,361,072 | A | 11/1994 | Barrick et al. | |
| 5,376,939 | A | 12/1994 | Urkowitz | |
| 5,379,322 | A | 1/1995 | Kosaka et al. | |
| 5,497,162 | A | 3/1996 | Kaiser | |
| 5,508,706 | A | 4/1996 | Tsou et al. | |
| 5,581,464 | A | 12/1996 | Woll et al. | |
| 5,654,715 | A | 8/1997 | Hayashikura et al. | |
| 5,657,021 | A | 8/1997 | Ehsani-Nategh et al. | |
| 5,657,023 | A | 8/1997 | Lewis et al. | |
| 5,682,605 | A | 10/1997 | Salter | |
| 5,691,724 | A | 11/1997 | Aker et al. | |
| 5,712,640 | A | 1/1998 | Andou | |
| 5,724,041 | A | 3/1998 | Inoue et al. | |
| 5,847,661 | A | 12/1998 | Ricci | |
| 5,892,477 | A | 4/1999 | Wehling | |
| 5,917,430 | A | 6/1999 | Greneker, III et al. | |
| 5,920,285 | A | 7/1999 | Benjamin | |
| 5,931,893 | A | 8/1999 | Dent et al. | |
| 5,959,571 | A | 9/1999 | Aoyagi et al. | |
| 5,970,400 | A | 10/1999 | Dwyer | |
| 6,048,315 | A | 4/2000 | Chiao et al. | |
| 6,067,314 | A | 5/2000 | Azuma | |
| 6,069,581 | A | 5/2000 | Bell et al. | |
| 6,121,872 | A | 9/2000 | Weishaupt | |
| 6,121,918 | A | 9/2000 | Tullsson | |
| 6,151,366 | A | 11/2000 | Yip | |
| 6,163,252 | A | 12/2000 | Nishiwaki | |
| 6,184,829 | B1 | 2/2001 | Stilp | |
| 6,191,726 | B1 | 2/2001 | Tullsson | |
| 6,208,248 | B1 | 3/2001 | Ross | |
| 6,219,375 | B1 * | 4/2001 | Dent ........................ | H01Q 3/26 708/620 |
| 6,288,672 | B1 | 9/2001 | Asano et al. | |
| 6,307,622 | B1 | 10/2001 | Lewis | |
| 6,335,700 | B1 | 1/2002 | Ashihara | |
| 6,347,264 | B2 | 2/2002 | Nicosia et al. | |
| 6,396,436 | B1 | 5/2002 | Lissel et al. | |
| 6,400,308 | B1 | 6/2002 | Bell et al. | |
| 6,411,250 | B1 | 6/2002 | Oswald et al. | |
| 6,417,796 | B1 | 7/2002 | Bowlds | |
| 6,424,289 | B2 | 7/2002 | Fukae et al. | |
| 6,547,733 | B2 | 4/2003 | Hwang et al. | |
| 6,583,753 | B1 | 6/2003 | Reed | |
| 6,614,387 | B1 | 9/2003 | Deadman | |
| 6,624,784 | B1 | 9/2003 | Yamaguchi | |
| 6,674,908 | B1 | 1/2004 | Aronov | |
| 6,683,560 | B2 | 1/2004 | Bauhahn | |
| 6,693,582 | B2 | 2/2004 | Steinlechner et al. | |
| 6,714,956 | B1 | 3/2004 | Liu et al. | |
| 6,747,595 | B2 | 6/2004 | Hirabe | |
| 6,768,391 | B1 | 7/2004 | Dent et al. | |
| 6,865,218 | B1 | 3/2005 | Sourour | |
| 6,867,732 | B1 | 3/2005 | Chen et al. | |
| 6,888,372 | B1 * | 5/2005 | Hazanchuk ............. | G06F 7/523 326/38 |
| 6,888,491 | B2 | 5/2005 | Richter | |
| 6,975,246 | B1 | 12/2005 | Trudeau | |
| 7,066,886 | B2 | 6/2006 | Song et al. | |
| 7,119,739 | B1 | 10/2006 | Struckman | |
| 7,130,663 | B2 | 10/2006 | Guo | |
| 7,202,776 | B2 | 4/2007 | Breed | |
| 7,289,058 | B2 | 10/2007 | Shima | |
| 7,299,251 | B2 | 11/2007 | Skidmore et al. | |
| 7,338,450 | B2 | 3/2008 | Kristofferson et al. | |
| 7,395,084 | B2 | 7/2008 | Anttila | |
| 7,460,055 | B2 | 12/2008 | Nishijima et al. | |
| 7,474,258 | B1 | 1/2009 | Arikan et al. | |
| 7,545,310 | B2 | 6/2009 | Matsuoka | |
| 7,545,321 | B2 | 6/2009 | Kawasaki | |
| 7,564,400 | B2 | 7/2009 | Fukuda | |
| 7,567,204 | B2 | 7/2009 | Sakamoto | |
| 7,609,198 | B2 | 10/2009 | Chang | |
| 7,642,952 | B2 | 1/2010 | Fukuda | |
| 7,663,533 | B2 | 2/2010 | Toennesen | |
| 7,667,637 | B2 | 2/2010 | Pedersen et al. | |
| 7,728,762 | B2 | 6/2010 | Sakamoto | |
| 7,791,528 | B2 | 9/2010 | Klotzbuecher | |
| 7,847,731 | B2 | 12/2010 | Wiesbeck et al. | |
| 7,855,677 | B2 | 12/2010 | Negoro et al. | |
| 7,859,450 | B2 | 12/2010 | Shirakawa et al. | |
| 8,019,352 | B2 | 9/2011 | Rappaport et al. | |
| 8,044,845 | B2 | 10/2011 | Saunders | |
| 8,049,663 | B2 | 11/2011 | Frank et al. | |
| 8,059,026 | B1 | 11/2011 | Nunez | |
| 8,102,306 | B2 | 1/2012 | Smith, Jr. et al. | |
| 8,115,672 | B2 | 2/2012 | Nouvel et al. | |
| 8,154,436 | B2 | 4/2012 | Szajnowski | |
| 8,169,359 | B2 | 5/2012 | Aoyagi | |
| 8,212,713 | B2 | 7/2012 | Aiga et al. | |
| 8,330,650 | B2 | 12/2012 | Goldman | |
| 8,390,507 | B2 | 3/2013 | Wintermantel | |
| 8,471,760 | B2 | 6/2013 | Szajnowski | |
| 8,532,159 | B2 | 9/2013 | Kagawa et al. | |
| 8,547,988 | B2 | 10/2013 | Hadani et al. | |
| 8,686,894 | B2 | 4/2014 | Fukuda et al. | |
| 8,694,306 | B1 | 4/2014 | Short et al. | |
| 8,994,581 | B1 | 3/2015 | Brown | |
| 9,121,943 | B2 | 9/2015 | Stirlin-Gallacher et al. | |
| 9,182,479 | B2 | 11/2015 | Chen et al. | |
| 9,239,378 | B2 | 1/2016 | Kishigami et al. | |
| 9,239,379 | B2 | 1/2016 | Burgio et al. | |
| 9,274,217 | B2 | 3/2016 | Chang et al. | |
| 9,282,945 | B2 | 3/2016 | Smith et al. | |
| 9,335,402 | B2 | 5/2016 | Maeno et al. | |
| 9,400,328 | B2 | 7/2016 | Hsiao et al. | |
| 9,541,639 | B2 | 1/2017 | Searcy et al. | |

(56) References Cited

U.S. PATENT DOCUMENTS 9,568,600 B2 2/2017 Alland
9,575,160 B1 2/2017 Davis et al.
9,599,702 B1 3/2017 Bordes et al.
9,689,967 B1 6/2017 Stark et al.
9,720,073 B1 8/2017 Davis et al.
9,720,080 B1 8/2017 Rodenbeck
9,753,121 B1 9/2017 Davis
9,753,132 B1 9/2017 Bordes et al.
9,772,397 B1 9/2017 Bordes et al.
9,791,551 B1 10/2017 Eshraghi et al.
9,791,564 B1 10/2017 Harris et al.
9,806,914 B1 10/2017 Bordes et al.
9,829,567 B1 11/2017 Davis et al.
9,846,228 B2 12/2017 Davis et al.
9,869,762 B1 1/2018 Alland et al.
9,954,955 B2 4/2018 Davis et al.
9,989,627 B2 6/2018 Eshraghi et al.
10,090,585 B2 10/2018 Dinc et al.
10,092,192 B2 10/2018 Lashkari et al.
10,215,853 B2 2/2019 Stark et al.
10,305,611 B1 5/2019 Rimini et al.
10,536,529 B2 1/2020 Davis et al.
10,852,408 B2 12/2020 Aslett et al.
11,105,890 B2 8/2021 Behrens et al.
11,271,328 B2 3/2022 Liu et al.
2001/0002919 A1 6/2001 Sourour et al.
2002/0004692 A1 1/2002 Nicosia et al.
2002/0044082 A1 4/2002 Woodington et al.
2002/0075178 A1 6/2002 Woodington et al.
2002/0118522 A1 8/2002 Ho et al.
2002/0130811 A1 9/2002 Voigtlaender
2002/0147534 A1 10/2002 Delcheccolo et al.
2002/0155811 A1 10/2002 Prismantas
2003/0001772 A1 1/2003 Woodington et al.
2003/0011519 A1 1/2003 Breglia et al.
2003/0058166 A1 3/2003 Hirabe
2003/0073463 A1 4/2003 Shapira
2003/0080713 A1 5/2003 Kirmuss
2003/0102997 A1 6/2003 Levin et al.
2003/0164791 A1 9/2003 Shinoda et al.
2003/0235244 A1 12/2003 Pessoa et al.
2004/0012516 A1 1/2004 Schiffmann
2004/0015529 A1 1/2004 Tanrikulu et al.
2004/0066323 A1 4/2004 Richter
2004/0070532 A1 4/2004 Ishii et al.
2004/0107030 A1 6/2004 Nishira et al.
2004/0138802 A1 7/2004 Kuragaki et al.
2004/0215373 A1 10/2004 Won et al.
2004/0229590 A1 11/2004 Kubo et al.
2005/0008065 A1 1/2005 Schilling
2005/0069162 A1 3/2005 Haykin
2005/0090274 A1 4/2005 Miyashita
2005/0156780 A1 7/2005 Bonthron et al.
2005/0201457 A1 9/2005 Allred et al.
2005/0225476 A1 10/2005 Hoetzel et al.
2005/0273480 A1 12/2005 Pugh et al.
2006/0012511 A1 1/2006 Dooi et al.
2006/0036353 A1 2/2006 Wintermantel
2006/0050707 A1 3/2006 Sterin
2006/0093078 A1 5/2006 Lewis et al.
2006/0109170 A1 5/2006 Voigtlaender et al.
2006/0109931 A1 5/2006 Asai
2006/0114324 A1 6/2006 Farmer et al.
2006/0140249 A1 6/2006 Kohno
2006/0181448 A1 8/2006 Natsume et al.
2006/0220943 A1 10/2006 Schlick et al.
2006/0244653 A1 11/2006 Szajnowski
2006/0262007 A1 11/2006 Bonthron
2006/0262009 A1 11/2006 Watanabe
2007/0018884 A1 1/2007 Adams
2007/0018886 A1 1/2007 Watanabe et al.
2007/0096885 A1 5/2007 Cheng et al.
2007/0109175 A1 5/2007 Fukuda
2007/0115869 A1 5/2007 Lakkis
2007/0120731 A1 5/2007 Kelly, Jr. et al.
2007/0132633 A1 6/2007 Uchino
2007/0152870 A1 7/2007 Woodington et al.
2007/0152871 A1 7/2007 Puglia
2007/0152872 A1 7/2007 Woodington
2007/0164896 A1 7/2007 Suzuki et al.
2007/0171122 A1 7/2007 Nakano
2007/0182619 A1 8/2007 Honda et al.
2007/0182623 A1 8/2007 Zeng
2007/0188373 A1 8/2007 Shirakawa et al.
2007/0200747 A1 8/2007 Okai
2007/0263748 A1 11/2007 Mesecher
2007/0279303 A1 12/2007 Schoebel
2008/0080599 A1 4/2008 Kang
2008/0088499 A1 4/2008 Bonthron
2008/0094274 A1 4/2008 Nakanishi
2008/0150790 A1 6/2008 Voigtlaender et al.
2008/0180311 A1 7/2008 Mikami
2008/0208472 A1 8/2008 Morcom
2008/0218406 A1 9/2008 Nakanishi
2008/0258964 A1 10/2008 Schoeberl
2008/0272955 A1 11/2008 Yonak et al.
2009/0003412 A1 1/2009 Negoro et al.
2009/0015459 A1 1/2009 Mahler et al.
2009/0015464 A1 1/2009 Fukuda
2009/0027257 A1 1/2009 Arikan
2009/0046000 A1 2/2009 Matsuoka
2009/0051581 A1 2/2009 Hatono
2009/0072957 A1 3/2009 Wu et al.
2009/0073025 A1 3/2009 Inoue et al.
2009/0074031 A1 3/2009 Fukuda
2009/0079617 A1 3/2009 Shirakawa et al.
2009/0085827 A1 4/2009 Orime et al.
2009/0103593 A1 4/2009 Bergamo
2009/0121918 A1 5/2009 Shirai et al.
2009/0212998 A1 8/2009 Szajnowski
2009/0237293 A1 9/2009 Sakuma
2009/0254260 A1 10/2009 Nix et al.
2009/0267822 A1 10/2009 Shinoda et al.
2009/0289831 A1 11/2009 Akita
2009/0295623 A1 12/2009 Falk
2010/0001897 A1 1/2010 Lyman
2010/0019950 A1 1/2010 Yamano et al.
2010/0039311 A1 2/2010 Woodington et al.
2010/0039313 A1 2/2010 Morris
2010/0116365 A1 5/2010 McCarty
2010/0156690 A1 6/2010 Kim et al.
2010/0166121 A1 7/2010 Kenney, Jr.
2010/0198513 A1 8/2010 Zeng et al.
2010/0202495 A1 8/2010 Kagawa et al.
2010/0253573 A1 10/2010 Holzheimer et al.
2010/0277359 A1 11/2010 Ando
2010/0289692 A1 11/2010 Winkler
2011/0006944 A1 1/2011 Goldman
2011/0032138 A1 2/2011 Krapf
2011/0074620 A1 3/2011 Wintermantel
2011/0187600 A1 8/2011 Landt
2011/0196568 A1 8/2011 Nickolaou
2011/0234448 A1 9/2011 Hayase
2011/0248796 A1 10/2011 Pozgay
2011/0279303 A1 11/2011 Smith, Jr. et al.
2011/0279307 A1 11/2011 Song
2011/0285576 A1 11/2011 Lynam
2011/0291874 A1 12/2011 De Mersseman
2011/0291875 A1 12/2011 Szajnowski
2011/0292971 A1 12/2011 Hadani et al.
2011/0298653 A1 12/2011 Mizutani
2012/0001791 A1 1/2012 Wintermantel
2012/0050092 A1 3/2012 Lee et al.
2012/0050093 A1 3/2012 Heilmann et al.
2012/0105268 A1 5/2012 Smits et al.
2012/0112957 A1 5/2012 Nguyen et al.
2012/0133547 A1 5/2012 MacDonald et al.
2012/0146834 A1 6/2012 Karr
2012/0173246 A1 7/2012 Choi et al.
2012/0195349 A1 8/2012 Lakkis
2012/0249356 A1 10/2012 Shope
2012/0257643 A1 10/2012 Wu et al.
2012/0283987 A1 11/2012 Busking et al.
2012/0314799 A1 12/2012 In De Betou et al.

(56) References Cited

U.S. PATENT DOCUMENTS

| | | | |
|---|---|---|---|
| 2012/0319900 | A1 | 12/2012 | Johansson et al. |
| 2013/0016761 | A1 | 1/2013 | Nentwig |
| 2013/0021196 | A1 | 1/2013 | Himmelstoss |
| 2013/0027240 | A1 | 1/2013 | Chowdhury |
| 2013/0057436 | A1 | 3/2013 | Krasner et al. |
| 2013/0069818 | A1 | 3/2013 | Shirakawa et al. |
| 2013/0102254 | A1 | 4/2013 | Cyzs |
| 2013/0113647 | A1 | 5/2013 | Sentelle et al. |
| 2013/0113652 | A1 | 5/2013 | Smits et al. |
| 2013/0113653 | A1 | 5/2013 | Kishigami et al. |
| 2013/0135140 | A1 | 5/2013 | Kishigami |
| 2013/0169468 | A1 | 7/2013 | Johnson et al. |
| 2013/0169485 | A1 | 7/2013 | Lynch |
| 2013/0176154 | A1 | 7/2013 | Bonaccio et al. |
| 2013/0214961 | A1 | 8/2013 | Lee et al. |
| 2013/0229301 | A1 | 9/2013 | Kanamoto |
| 2013/0244710 | A1 | 9/2013 | Nguyen et al. |
| 2013/0249730 | A1 | 9/2013 | Adcook |
| 2013/0314271 | A1 | 11/2013 | Braswell et al. |
| 2013/0321196 | A1 | 12/2013 | Binzer et al. |
| 2014/0022108 | A1 | 1/2014 | Alberth, Jr. et al. |
| 2014/0028491 | A1 | 1/2014 | Ferguson |
| 2014/0035774 | A1 | 2/2014 | Khlifi |
| 2014/0049423 | A1 | 2/2014 | De Jong et al. |
| 2014/0070985 | A1 | 3/2014 | Vacanti |
| 2014/0085128 | A1 | 3/2014 | Kishigami et al. |
| 2014/0097987 | A1 | 4/2014 | Worl et al. |
| 2014/0111367 | A1 | 4/2014 | Kishigami et al. |
| 2014/0111372 | A1 | 4/2014 | Wu |
| 2014/0139322 | A1 | 5/2014 | Wang et al. |
| 2014/0159948 | A1 | 6/2014 | Ishimori et al. |
| 2014/0168004 | A1 | 6/2014 | Chen et al. |
| 2014/0220903 | A1 | 8/2014 | Schulz et al. |
| 2014/0253345 | A1 | 9/2014 | Breed |
| 2014/0253364 | A1 | 9/2014 | Lee et al. |
| 2014/0285373 | A1 | 9/2014 | Kuwahara et al. |
| 2014/0316261 | A1 | 10/2014 | Lux et al. |
| 2014/0327566 | A1 | 11/2014 | Burgio et al. |
| 2014/0340254 | A1 | 11/2014 | Hesse |
| 2014/0348253 | A1 | 11/2014 | Mobasher et al. |
| 2014/0350815 | A1 | 11/2014 | Kambe |
| 2015/0002329 | A1 | 1/2015 | Murad et al. |
| 2015/0002357 | A1 | 1/2015 | Sanford et al. |
| 2015/0035662 | A1 | 2/2015 | Bowers et al. |
| 2015/0061922 | A1 | 3/2015 | Kishigami |
| 2015/0103745 | A1 | 4/2015 | Negus et al. |
| 2015/0153445 | A1 | 6/2015 | Jansen |
| 2015/0160335 | A1 | 6/2015 | Lynch et al. |
| 2015/0198709 | A1 | 7/2015 | Inoue |
| 2015/0204966 | A1 | 7/2015 | Kishigami |
| 2015/0204971 | A1 | 7/2015 | Yoshimura et al. |
| 2015/0204972 | A1 | 7/2015 | Kuehnle et al. |
| 2015/0226838 | A1 | 8/2015 | Hayakawa |
| 2015/0226848 | A1 | 8/2015 | Park |
| 2015/0234045 | A1 | 8/2015 | Rosenblum |
| 2015/0247924 | A1 | 9/2015 | Kishigami |
| 2015/0255867 | A1 | 9/2015 | Inoue |
| 2015/0301172 | A1 | 10/2015 | Ossowska |
| 2015/0323660 | A1 | 11/2015 | Hampikian |
| 2015/0331090 | A1 | 11/2015 | Jeong et al. |
| 2015/0369912 | A1 | 12/2015 | Kishigami et al. |
| 2015/0373167 | A1 | 12/2015 | Murashov et al. |
| 2016/0003938 | A1 | 1/2016 | Gazit et al. |
| 2016/0003939 | A1 | 1/2016 | Stainvas Olshansky et al. |
| 2016/0018511 | A1 | 1/2016 | Nayyar et al. |
| 2016/0025844 | A1 | 1/2016 | Mckitterick et al. |
| 2016/0033623 | A1 | 2/2016 | Holder |
| 2016/0033631 | A1 | 2/2016 | Searcy et al. |
| 2016/0033632 | A1 | 2/2016 | Searcy et al. |
| 2016/0041260 | A1 | 2/2016 | Cao et al. |
| 2016/0054441 | A1 | 2/2016 | Kuo et al. |
| 2016/0061935 | A1 | 3/2016 | McCloskey et al. |
| 2016/0084941 | A1 | 3/2016 | Arage |
| 2016/0084943 | A1 | 3/2016 | Arage |
| 2016/0091595 | A1 | 3/2016 | Alcalde |
| 2016/0103206 | A1 | 4/2016 | Pavao-Moreira et al. |
| 2016/0124075 | A1 | 5/2016 | Vogt et al. |
| 2016/0124086 | A1 | 5/2016 | Jansen et al. |
| 2016/0131752 | A1 | 5/2016 | Jansen et al. |
| 2016/0139254 | A1 | 5/2016 | Wittenberg |
| 2016/0146931 | A1 | 5/2016 | Rao et al. |
| 2016/0154103 | A1 | 6/2016 | Moriuchi |
| 2016/0157828 | A1 | 6/2016 | Sumi et al. |
| 2016/0178732 | A1 | 6/2016 | Oka et al. |
| 2016/0213258 | A1 | 7/2016 | Lashkari et al. |
| 2016/0223644 | A1 | 8/2016 | Soga |
| 2016/0238694 | A1 | 8/2016 | Kishigami |
| 2016/0245909 | A1 | 8/2016 | Aslett et al. |
| 2016/0349365 | A1 | 12/2016 | Ling |
| 2017/0010361 | A1 | 1/2017 | Tanaka |
| 2017/0023661 | A1 | 1/2017 | Richert |
| 2017/0023663 | A1 | 1/2017 | Subburaj et al. |
| 2017/0074980 | A1 | 3/2017 | Adib |
| 2017/0090015 | A1 | 3/2017 | Breen et al. |
| 2017/0117950 | A1 | 4/2017 | Strong |
| 2017/0153316 | A1 | 6/2017 | Wintermantel |
| 2017/0176583 | A1 | 6/2017 | Gulden et al. |
| 2017/0212213 | A1 | 7/2017 | Kishigami |
| 2017/0219689 | A1 | 8/2017 | Hung et al. |
| 2017/0234968 | A1 | 8/2017 | Roger et al. |
| 2017/0293025 | A1 | 10/2017 | Davis et al. |
| 2017/0293027 | A1 | 10/2017 | Stark et al. |
| 2017/0307728 | A1 | 10/2017 | Eshraghi et al. |
| 2017/0309997 | A1 | 10/2017 | Alland et al. |
| 2017/0310758 | A1 | 10/2017 | Davis et al. |
| 2017/0336495 | A1 | 11/2017 | Davis et al. |
| 2018/0003799 | A1 | 1/2018 | Yang et al. |
| 2018/0019755 | A1 | 1/2018 | Josefsberg et al. |
| 2018/0074168 | A1 | 3/2018 | Subburaj et al. |
| 2018/0095163 | A1 | 4/2018 | Lovberg et al. |
| 2018/0113191 | A1 | 4/2018 | Villeval et al. |
| 2018/0115371 | A1 | 4/2018 | Trotta et al. |
| 2018/0149730 | A1 | 5/2018 | Li et al. |
| 2018/0175907 | A1 | 6/2018 | Marr |
| 2018/0252809 | A1 | 9/2018 | Davis et al. |
| 2018/0294908 | A1 | 10/2018 | Abdelmonem |
| 2018/0358706 | A1 | 12/2018 | Kildal et al. |
| 2019/0064364 | A1 | 2/2019 | Boysel et al. |
| 2019/0072641 | A1 | 3/2019 | Al-Stouhi et al. |
| 2019/0178983 | A1 | 6/2019 | Lin et al. |
| 2019/0219685 | A1 | 7/2019 | Shan |
| 2019/0324134 | A1 | 10/2019 | Cattle |
| 2019/0383929 | A1 | 12/2019 | Melzer et al. |
| 2020/0064455 | A1 | 2/2020 | Schroder et al. |
| 2020/0160161 | A1 * | 5/2020 | Yoo .......................... G06N 3/04 |
| 2020/0191939 | A1 | 6/2020 | Wu et al. |
| 2020/0292666 | A1 | 9/2020 | Maher et al. |

FOREIGN PATENT DOCUMENTS

| | | |
|---|---|---|
| EP | 0725480 | 11/2011 |
| EP | 2374217 | 4/2013 |
| EP | 2884299 | 6/2015 |
| EP | 2821808 | 7/2015 |
| FR | 2751086 | 1/1998 |
| JP | 2010243330 | 10/2010 |
| KR | 101010522 | 1/2011 |
| WO | WO2008022981 | 2/2008 |
| WO | WO2015175078 | 11/2015 |
| WO | WO2015185058 | 12/2015 |
| WO | WO2016011407 | 1/2016 |
| WO | WO2016030656 | 3/2016 |
| WO | WO2017059961 | 4/2017 |
| WO | WO2017175190 | 10/2017 |
| WO | WO2017187330 | 11/2017 |

OTHER PUBLICATIONS

Fraser, "Design and simulation of a coded sequence ground penetrating radar," In: Diss. University of British Columbia, Dec. 3, 2015.

(56) References Cited

OTHER PUBLICATIONS

Zhou et al., "Linear extractors for extracting randomness from noisy sources," In: Information Theory Proceedings (ISIT), 2011 IEEE International Symposium on Oct. 3, 2011.
V. Giannini et al., "A 79 GHz Phase-Modulated 4 GHz-BW CW Radar Transmitter in 28 nm CMOS," in IEEE Journal of Solid-State Circuits, vol. 49, No. 12, pp. 2925-2937, Dec. 2014. (Year: 2014).
Óscar Faus García, "Signal Processing for mm Wave MIMO Radar," University of Gavle, Faculty of Engineering and Sustainable Development, Jun. 2015; Retrieved from the Internet from http://www.diva-portal.se/smash/get/diva2:826028/FULLTEXT01.pdf.
Levanan Nadav et al., "Non-coherent pulse compression—aperiodic and periodic waveforms", IET Radar, Sonar & Navagation, The Institution of Engineering and Technology, Jan. 1, 2016, pp. 216-224, vol. 10, Iss. 1, UK.
Akihiro Kajiwara, "Stepped-FM Pulse Radar for Vehicular Collision Avoidance", Electronics and Communications in Japan, Part 1, Mar. 1998, pp. 234-239, vol. 82, No. 6 1999.
A. Bourdoux, U. Ahamd, D. Guermandi, S. Brebels, A. Dewilde, W. Van Thillo, PMCW "Waveform and MIMO Technique for a 79 GHz CMOS Automotive Radar", 2016 IEEE Radar Conference (RadarConf), 2016, pp. 1-5, doi: 10.1109/RADAR.2016.7485114. (Year: 2016).
V. Jain, F. Tzeng, L. Zhou and P. Heydari, "A single-Chip Dual-Band 22-29-GHz/77-81-GHz BiCMOS Transceiver for Automotive Radars," in IEEE Journal of Solid-State Circuits, vol. 44, No. 12, pp. 3469-3485, Dec. 2009, doi: 10.1109/JSSC.2009.2032583. (Year: 2009).
A. Medra et al., "An 80 GHz Low-Noise Amplifier Resilient to the TX Spillover in Phase-Modulated Continuous-Wave Radars," In IEEE Journal of Solid-State Circuits, vol. 51, No. 5, pp. 1141-1153, May 2016, doi: 10.1109/JSSC.2016.2520962. (Year: 2016).

* cited by examiner

Multiplication of an MxN matrix
to an N-element vector

Binary expansion of matrix values
and selection of groups of 3 digits

Forming all possible combinations of a group of values using only one addition per value Adder tree to form all combinations of a group of values Elimination of the negative values in FIGS. 1 and 2 by adding 1 and dividing by 2 (a downshift)

Hardware to form the first product Ro

Hardware to form the first product Ro including subtraction of half the sum of the vector values Complex-valued matrix x vector Structure for the complex-valued case

N-POINT COMPLEX FOURIER TRANSFORM STRUCTURE HAVING ONLY 2N REAL MULTIPLIES, AND OTHER MATRIX MULTIPLY OPERATIONS

CROSS REFERENCE TO RELATED APPLICATIONS

The present application claims the filing benefits of U.S. provisional application, Ser. No. 63/140,567, filed Jan. 22, 2021, which is hereby incorporated by reference herein in its entirety.

FIELD OF THE INVENTION

The present invention is directed to radar systems, and more particularly to the processing of received data.

BACKGROUND OF THE INVENTION

In digital signal processing for radio and radar applications, the need to form the product of a matrix with a vector is often encountered. Often the values are complex numbers having a real and imaginary part, but the operation is implemented using real multiplies and adds. For example, a number N of sequentially received time samples may be subjected to a Fourier Analysis to obtain N spectral components. The well-known Fast Fourier Transform or FFT is conventionally used for this process as it requires a number of complex multiply/accumulate operations only of the order of N $\log_2(N)$ as opposed to the Discrete Fourier Transform (DFT) which needs $N^2$ such operations.

Digital beamforming is another operation that may be required in communications or radar applications.

For reception, a first number of antenna elements of an antenna array receive signals which are then digitized and submitted to digital beamforming to determine the signals received from each of a second number of directions. Such a receive beamforming operation may be expressed as multiplication of a vector of signal samples received at the same instant by the antenna elements by a fixed matrix of beamforming coefficients, the signal sample vector changing from sampling instant to sampling instant while the “fixed” matrix of beamforming coefficients may change only slowly if at all.

For transmission, digital beamforming takes a first plurality of digitized signal streams for transmission and creates therefrom a second plurality of signals to be transmitted from the second plurality of transmitter-antenna elements such that each signal is transmitted in a different desired direction. This also may be expressed as a matrix-times-vector operation similar to receive beamforming.

SUMMARY OF THE INVENTION

A logic structure suitable for chip integration is described that performs multiplication of an M×N matrix of multi-bit values to a vector of N multi-bit values in parallel, yielding all outputs at the same time. The structure treats a single bit of each element of one row of the matrix at a time, bits of like significance forming a row of single digits that in the binary case may be regarded as having values of (1 or 0), (1 or −1) or (1, 0, or −1). The latter ternary states arise if the matrix row values are in sign-magnitude form.

The row of single digits is then multiplied to the multi-bit vector. Since the digits are only +/−1 or 0, no multiplication is involved, and the result is simply sums and differences of the multi-bit vector. The inventive structure forms all possible sums and differences of groups of the multibit vector elements where a group size L can be smaller than the vector length N to keep the number of sums and differences, which is either $2^L$ or $3^L$ within a reasonable number. For example, a group of size L=8 would produce 256 combinations for binary digits or 6,561 in the ternary case. To avoid the much greater number in the ternary case, the following procedure is used:

The applications of interest (such as Fourier transforms and beamforming) have complex matrix elements which are of the form $\mathrm{Exp}(j\theta)=\{\cos(\theta)+j\sin(\theta)\}$. That is, every value has a magnitude less or equal to 1, which is added to all elements making their values lie between 0 and +2 and dividing by 2 makes the values lie between zero and 1. The addition of 1 to the matrix followed by division by 2 is compensated by multiplying the resulting matrix-vector product 2 and subtracting the sum of the vector elements from each result. Thus, ternary values caused by negative matrix values are thus eliminated and the bit-rows of the matrix are then binary, 1 or 0.

All combinations of a group of L of the N vector values with a weight of 0 or 1 are efficiently computed using just one addition per value, for example by forming the combinations in Grey Code order, in which the bit weights only differ in one position from one value to the next. These combinations will be used repeatedly for different rows of bits from the same and from different rows of matrix values.

If a group size L does not divide into N, different group sizes L1, L2 . . . , etc. can be used which sum to N.

The preformed combinations are then selected according to the specific bit pattern of bits of like significance selected from successive groups of matrix row elements, and the results using successive groups of row elements are added to obtain a partial product of the N-element vector with a whole row of N digits selected from the same matrix row. This is repeated by selected bits of different but like significance from the same matrix row to obtain partial products with other matrix digit-rows, the partial products being combined with a shift to account for the place-significance of the different matrix element digits with which the vector was multiplied. The result is the product of one matrix row with the vector. This is then repeated for all matrix rows to obtain the desired M-value matrix-vector product.

However large M may be, the same preformed combinations of the N-element vector values can be used for each row of digits and for each matrix row, wherein a gain in computational efficient is obtained.

In a preferred implementation, the precomputed combinations are computed on the fly using serial adders, and not stored in memory. The serial output streams of the serial adders are made available on a number of horizontal lines corresponding to the number of combinations, and a number of vertical lines, corresponding to the number of matrix rows M times the number of bits in each multi-bit matrix value, pick up selected precombinations for further addition by placing a serial adder at the crossing of the vertical line with the horizontal line carrying the bit stream of the selected combination. The vertical lines corresponding to bits of different significance of the same matrix row are finally combined with bit shifts corresponding to the bit place significance to yield the final results. This latter operation is the only structure that resembles a multiplier, and so it is claimed that only one multiplier is needed for each of the M output values.

Using the invention to perform multiplication of an N×N DFT matrix with a N-element vector to be transformed, a fully parallel DFT thus needs only N multiplies, which is faster than an FFT.

The method also accelerates the dot product of two vectors. It can be regarded as achieving this by avoiding accumulation of partial products of different place significance for each multiplication and instead accumulating partial products of the same significance across all multiplications before applying one shift-and-add operation to accumulated partial products of different place significance at the end.

For matrix and vector values that are complex, further additions of partial products such as Real×Real−Imaginary×Imaginary and Real×Imaginary+Imaginary×Real are performed. It may be arranged that the real and imaginary parts of a result appear adjacent to one another on a chip to minimize the routing required to perform a square-root-of-sum-of-squares operation on all result values.

DESCRIPTION OF THE PREFERRED EMBODIMENTS

Figure 1:
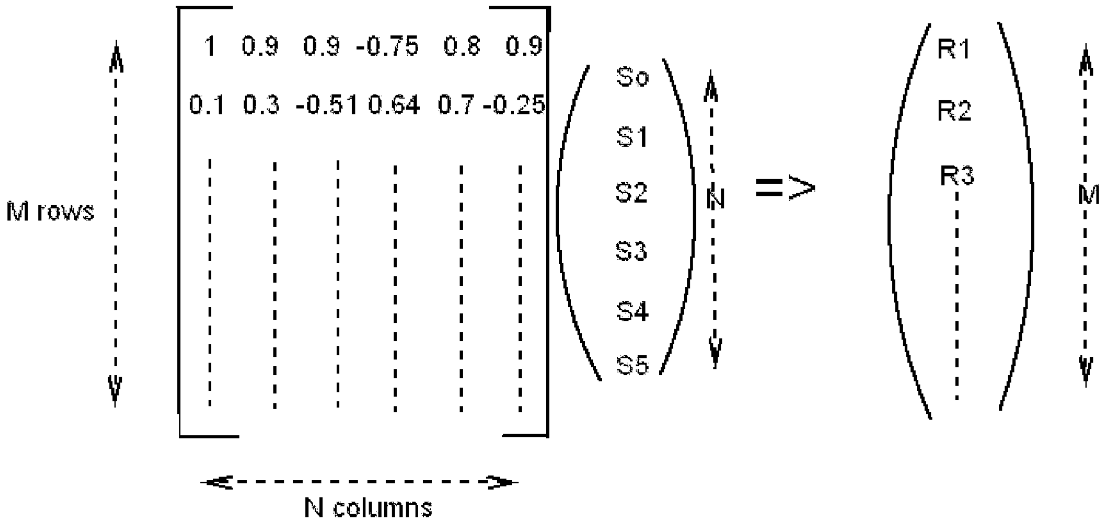
FIG. 1 illustrates an M×N matrix times N-elements vector multiplication in accordance with an embodiment of the present invention.

The present invention will now be described with reference to the accompanying figures, wherein numbered elements in the following written description correspond to like-numbered elements in the figures. Methods and systems of the present invention may include a logic structure suitable for chip integration that performs multiplication of an M×N matrix of multi-bit values to a vector of N multi-bit values in parallel, yielding all outputs at the same time. The exemplary structure treats a single bit of each element of one row of the matrix at a time, bits of like significance forming a row of single digits that in the binary case may be regarded as having values of (1 or 0), (1 or −1) or (1, 0, or −1). The latter ternary states arise if the matrix row values are in sign-magnitude form.

U.S. Pat. No. 6,219,375 to current inventor Paul W. Dent, filed 19 Jan. 1999 and entitled "Apparatus for Performing Multiplication of a Vector of Multi-Bit Values by a Matrix of Multi-Bit Coefficients" describes a "fast" matrix times vector method and apparatus when the matrix is fixed and the vector is variable by multiplying the matrix to a column of single bits of the vector elements at a time, the bits being of like place-significance. Since the bits take on only one of two values, for example (1 or 0), or (1 or −1), this multiplication generates only one of a limited number of all possible sums and differences of the matrix coefficients, which combinations can be precomputed and stored in look-up tables. In case the look-up tables become too large, the bit vector can be divided into smaller bit vectors that are multiplied by a correspondingly smaller number of matrix coefficients leading to smaller look-up tables. In the transmit beamforming case, it was disclosed that modulation of digital data on to a radio frequency carrier using linear modulation can be exchanged in order with the linear operation of transmit beamforming, such that the transmit beamforming only need operate on a single column of data bits at the data bit rate. The outputs of the beamformer were then subjected to the linear modulation operation, up-sampling and filtering after beamforming to produce spectrally-shaped I,Q samples at a sample rate of multiple samples per data bit. Thus, switching the order of modulation and beamforming resulted in the beamformer input vector having only a single column of binary values and the matrix multiplication with it takes place only at data bit rate instead of the higher I/Q sample rate. Moreover, there are no multiplies to be performed. The 6,219,375 patent (hereinafter "the '375 patent") is hereby incorporated by reference herein in its entirety.

Multiplication is a more complex operation than addition, and thus, there is a strong motivation to reduce multiplication operations. Multiplier hardware structures take more chip area and power than adder structures so there is also strong motivation to reduce multiplier structures needed for a given speed of computation.

The above-incorporated '375 patent also discloses how to perform fully parallel multiplication of an N×N matrix of multi-bit values to a vector of N multi-bit values using only N multiplier structures compared to the N2 that would be needed with a conventional approach.

The matrix-times-multi-bit-vector method of the '375 patent comprises performing matrix multiplication with a single column of the vector's bits of like significance at a time using look-up tables precomputed as a function of the matrix coefficients, and then combining the results for bit columns of different place significance by shifting the results according to place significance and adding. The latter operation is analogous to a multiplier structure that adds partial products; however, there is only one such structure needed per output value computed.

In a current application, a matrix-times-vector operation is required in which the matrix is M×N and the vector is of length N, and the number of rows M of the matrix is much greater than the number of columns, N; for example, N=256 and M=8192. In that case, the method of the '375 patent results in an excessive number of look-up tables to be precomputed and stored in memory. Therefore, an alternative method is sought which is described herein.

Referring to FIG. 1, a matrix of M×N fixed values is to be multiplied to different N-element vectors using custom chip hardware fabricated according to the invention described herein to maximize throughput while having small silicon area and low power consumption. The matrix values in a first exemplary explanation are specific real constants while the vector values S0, S1, S2, . . . S6 are the as yet unknown inputs and R1, R2, R3, . . . $R_M$ are the results to be computed.

It may be deduced from FIG. 1 that:

R1=1*S0+0.9*S1+0.9*S2−0.75*S3+0.8*S4+0.9*S5, where * stands for fixed point multiplication.

Figure 2:
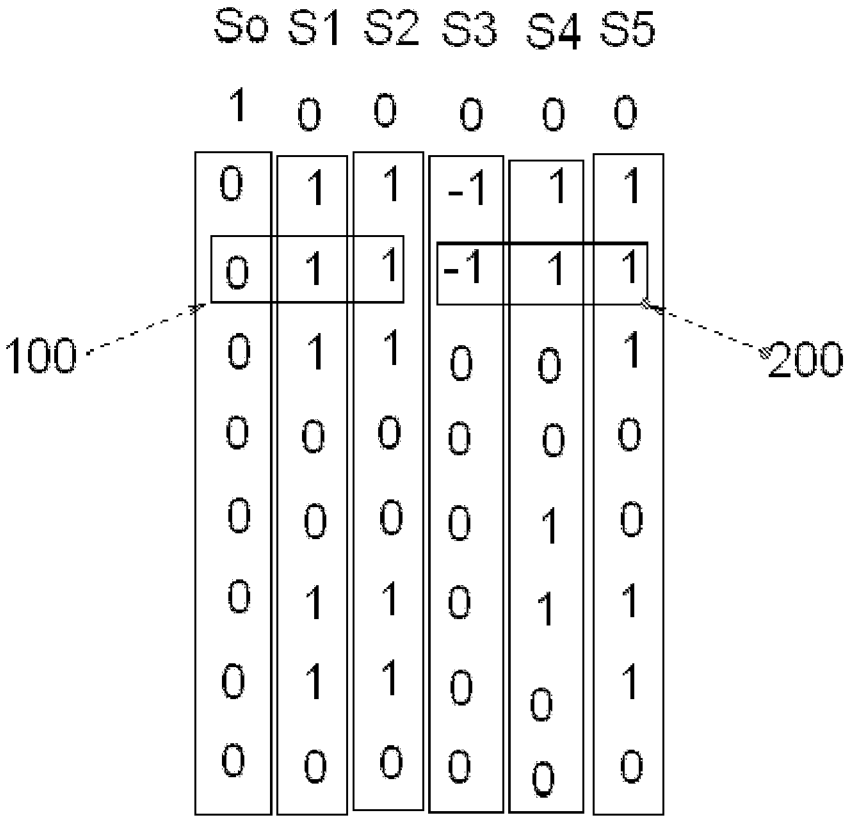
FIG. 2 illustrates the selection of a row of matrix digits in groups of L in accordance with an embodiment of the present invention.

FIG. 2 illustrates an expression of the first row of the matrix in binary sign-magnitude form and the selection of a group of L=3 digits of the same place significance. The upper row of bits are bits to the left of the binary point and only the first value (=1) has a non-zero bit in that position. The lower rows are bits to the right of the binary point of successively lower significance.

Figure 5:
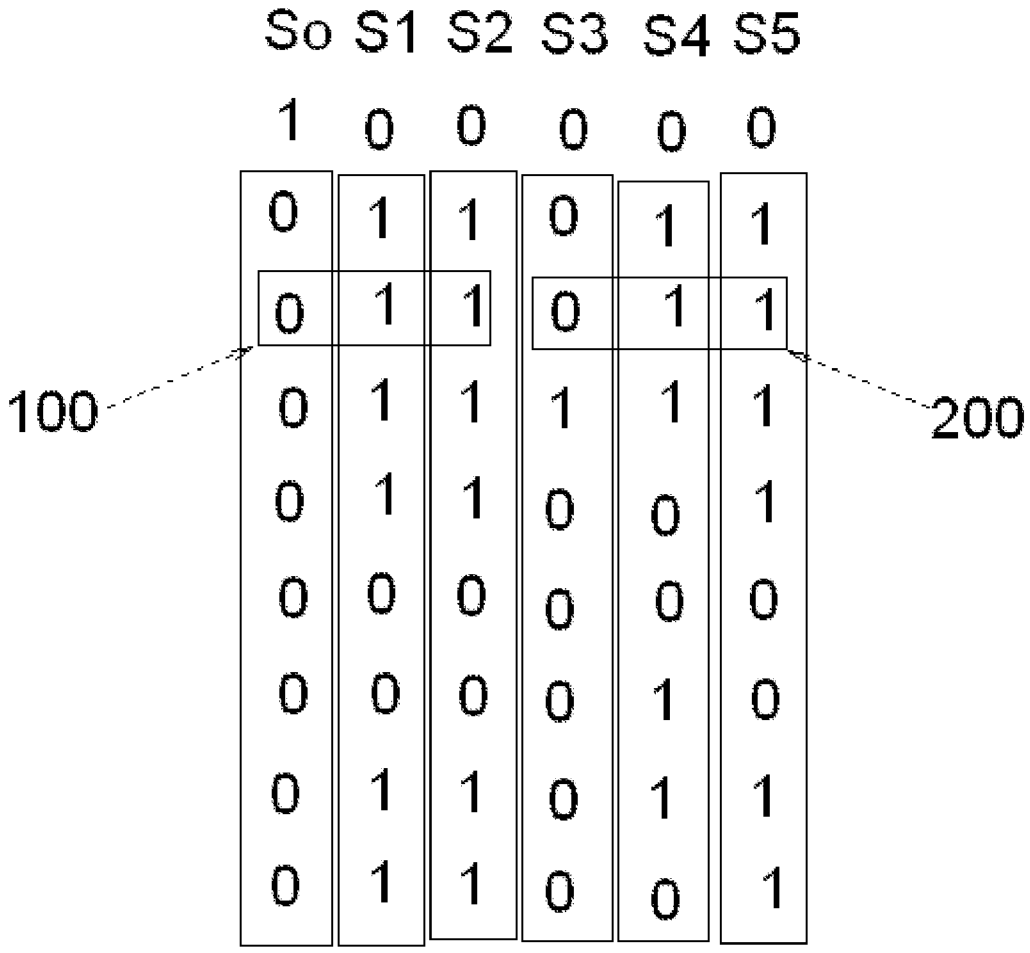
FIG. 5 illustrates the placement of serial adders in a string on vertical lines to select combinations of like significance for further addition in accordance with an embodiment of the present invention.

The selection of fewer than all N row values (N is only six in this case) results in a reduction of the number of combinations of the vector values that have to be formed. Using an exemplary L=3 and looking at the 3rd bit down, the first group 100 in FIG. 5 is 011 and weights vector values S0, S1 and S2, so that the combination 0*S0+1*S1+1*S2=S1+S2 results. This same combination is needed in rows 2, 4, 7, and 8, but only need be formed once. The second group 200 in FIG. 5 is −1, 1, 1 and weights S3, S4 and S5 resulting in −S3+S4+S5, and this same combination is required for the second group of bit row 2.

There can only be 3×3×3=27 possible combinations of three vector values needed whatever the matrix coefficients. The same 27 combinations suffice for all bit rows of all matrix rows, and thus need be formed once only.

For a larger N, it is desirable for L to be as large as possible, but if the single digits in the rows can take on ternary values, the number of combinations to be formed is $3^L$, which is 243 for L=5. For binary symbols, the value of L can go up to 8, so N can be divided into a smaller number of groups of 8. For example, if N=256, 32 groups of 8 can be used, and each group of 8 results in needing 256 precombinations of 8 vector values to be formed. There are 32 groups of 8 for N=256, so 32 times 256 combinations have to be formed. Alternatively, if L=4, 64 groups of 16 combinations would be needed. It is also possible to use different values of L for different groups if no one L divides into N. For example, if N=255, 31 groups of 8, and one group of 7, could be used, or 51 groups of 5. The greater the number of combinations that are precomputed at this stage, the fewer additions of partial products that have to be combined later, so there a tradeoff between the silicon area and power needed to form the precombinations and the later complexity. This tradeoff depends on how many output values are needed, and a larger number M of output values favors forming more precombinations early on.

Ternary values may be avoided by noting that in Fourier transform-like operations, such as DFTs or antenna beamforming, all the matrix values have real and imaginary parts that lie between −1 and +1. Consideration of the complex case occurs later herein but consider for now a real matrix comprising only cosines or sines with values between +1 and −1. These are all rendered positive by adding 1 to every matrix element, such that the values then lie between 0 and 2. The next step is dividing by 2 so that they all lie between 0 and 1. Adding 1 to all matrix values is equivalent to adding the sum of all the vector values to each result and is therefore compensated by subtracting the sum of all vector values from each of the final results. The division by 2 may be compensated if desired by first multiplying each result by 2 before subtracting the sum of the vector values; alternatively, half the sum of the vector values may be subtracted.

Figure 3:
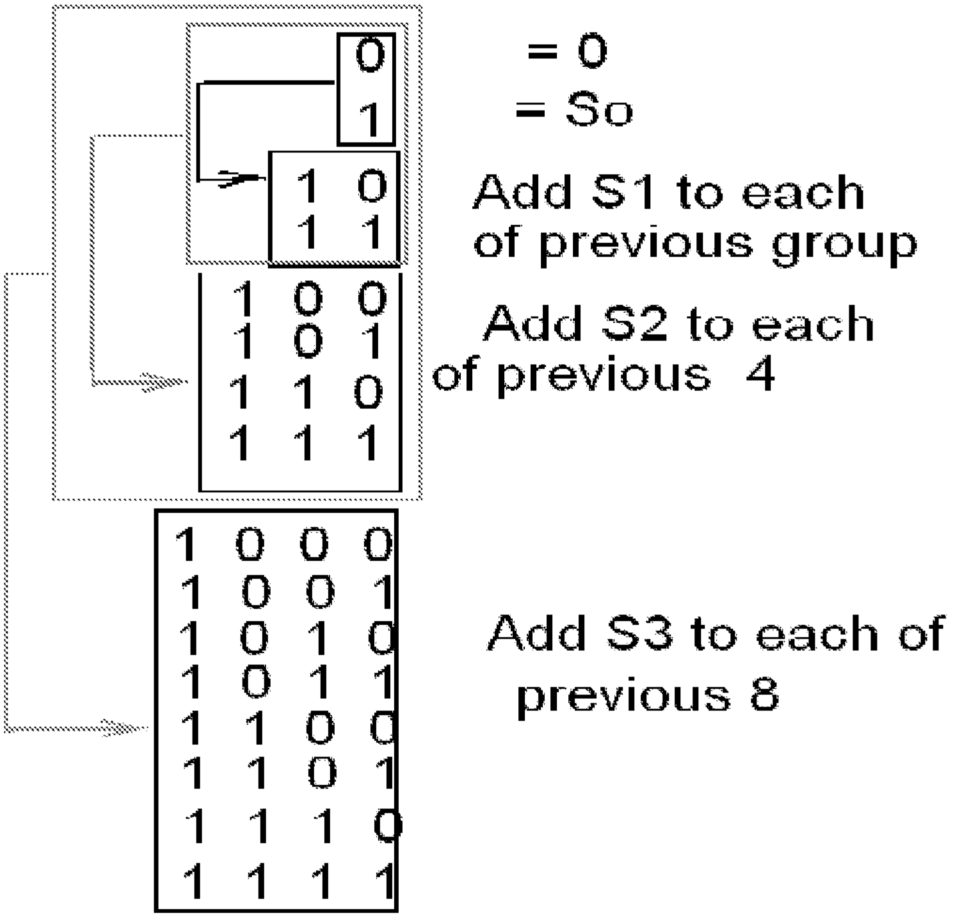
FIG. 3 illustrates the forming of combinations of L vector values with all possible L-bit binary weight patterns in accordance with an embodiment of the present invention.

FIG. 3 illustrates how all combinations of a group of L vector values are formed using only one addition per value. Starting at the top, the first bit of a group of L bits multiplies S0 with the result 0 or S0. These are the combinations when all other bits are zero. For the combinations where the second bit is not zero, but 1, since it weights S1, S1 must be added to the previous combinations to get two new combinations, making now four altogether corresponding to all four possible states of the first two bits of the group, with all other bits zero. Now, if the third bit is not zero but 1, since it weights S2, S2 must be added to all four previous values to get the four new combinations corresponding to bit 3=1, making now 8 combinations, and so forth, noting that the number of combinations doubles each time and that the number of adds per combination is only one.

Figure 4:
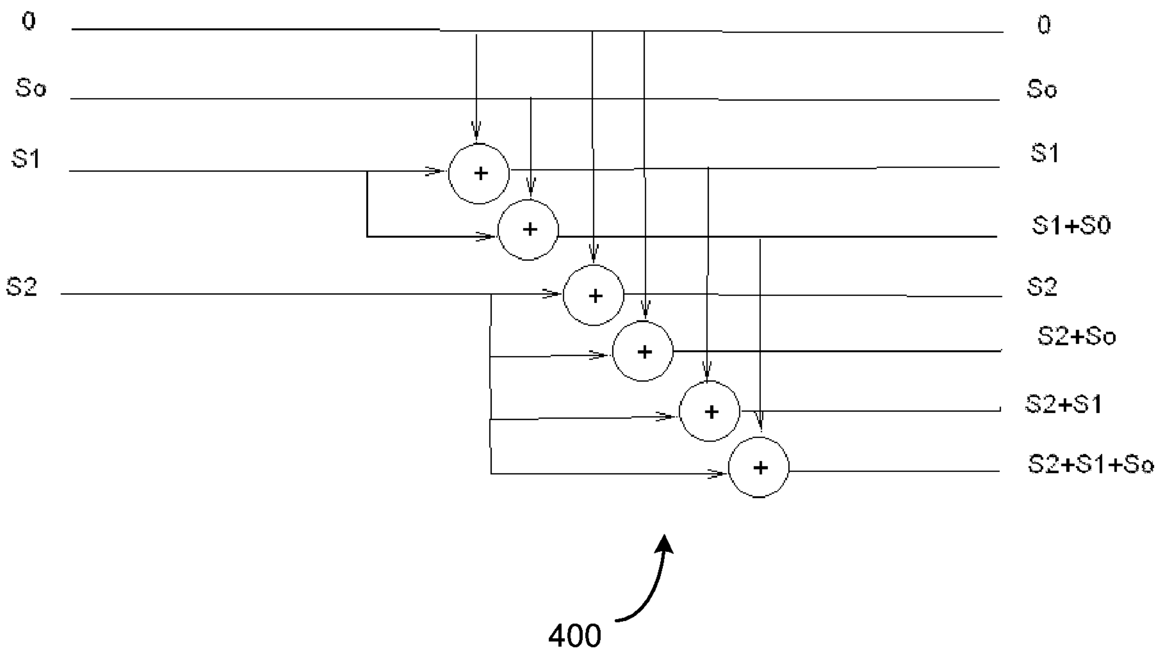
FIG. 4 illustrates an exemplary serial adder tree for forming all combinations in accordance with an embodiment of the present invention.

FIG. 4 illustrates an exemplary hardware implementation of FIG. 3 using an adder tree 400. If the adders of the adder tree 400 are parallel (word-) adders, each connection comprises multiple lines, one for each bit plus potential bit length expansion as the adding progresses (see FIG. 4). Serial adders on the other hand stream in the values LSB first on single lines. Each adder adds two bits plus a carry from its previous addition and outputs one bit plus a new carry which is fed back through a delay element to the input of the same adder. The delay element can be a flip flop or switched capacitors, known as a bucket-brigade delay line. An advantageous feature of a serial adder tree is that the LSB of the result is output substantially at the same time as the LSBs of the inputs are presented, and the time to perform the additions is simply the time to clock all bits through, plus a few extra clocks to flush out carries corresponding to word-length extension due to the addition of multiple values. A new set of values can be streamed in immediately following carry flushing of the previous set, meaning that successive sets of values shall be separated by an adequate number of zeros (or 1's in the case of 2-s complement negative values). The combinations produced by the adder tree 400 of FIG. 4 each appear on a unique digit-line in the case of serial adders, and each value may be needed to be added to other values in dependence on the actual bits of the matrix coefficients.

FIG. 5 illustrates the matrix of coefficients of FIGS. 1 and 2 transformed to eliminate ternary values by adding 1 to all and dividing by 2.

Figure 6:
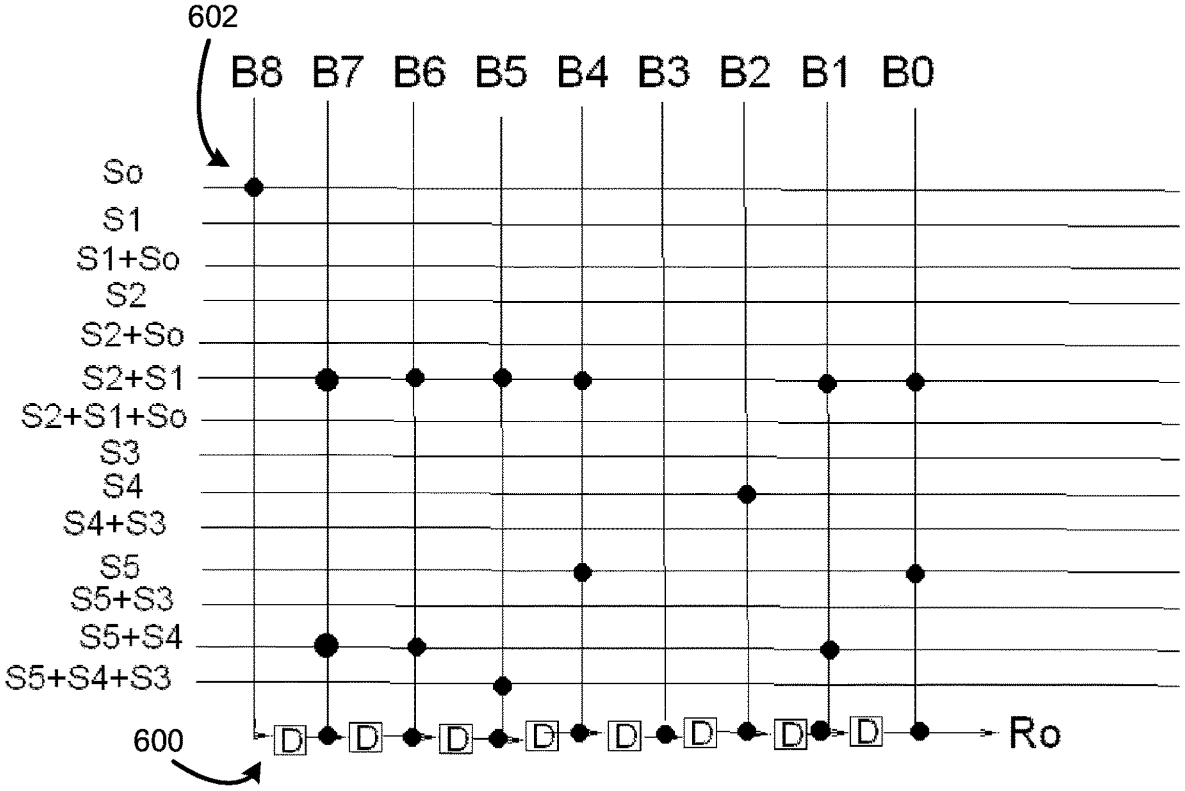
FIG. 6 illustrates exemplary hardware for forming the first product Ro in accordance with an embodiment of the present invention.

FIG. 6 illustrates how the precombinations produced by the adder tree of FIG. 4 are selected for further addition according to the transformed coefficients of FIG. 5.

In FIG. 6, a rectangle enclosing the letter D (D) 600 represents a 1-bit delay element, such as a flip flop (there are array of enclosed D's (D) 600 along the bottom of FIG. 6). The solid circles (●) 602 of FIG. 6 represent serial adders, including feedback carry delay. At the top of the illustration, "B8" represents the row of most significant bits of the N coefficients, which are split into groups of L. In this example, N=6 and there are two groups of L=3. Only one significant bit of the N matrix elements in this row is 1 in this case, and multiplies So. Therefore, there is only one adder dot in the B8 column where the vertical line crosses the horizontal line carrying the value So serially.

Figure 7:
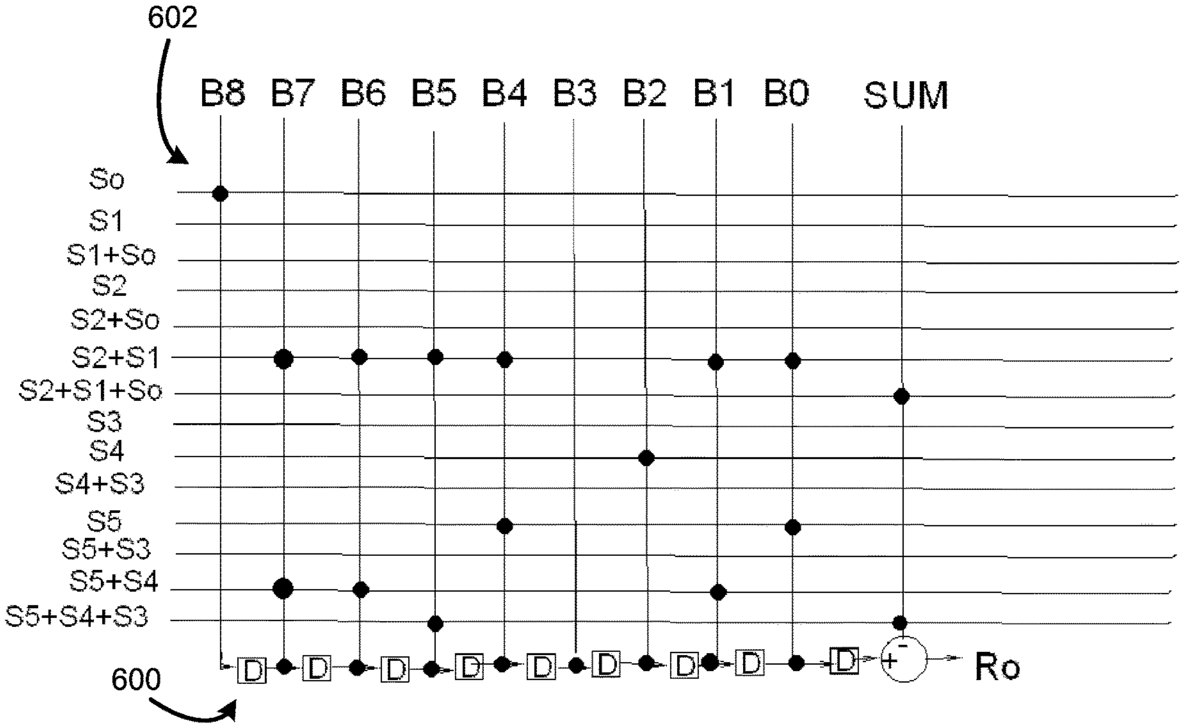
FIG. 7 illustrates the exemplary hardware of FIG. 6 modified to form the first product Ro including subtraction of half the sum of the vector values in accordance with the present invention.

"B7" represents the row bits just to the right of the binary point, that is, 011 011. The first 011 group signifies the addition of S1 and S2, therefore, a dot (●) (serial adder) 602 is place on the crossing of the "B7" vertical line with the horizontal line carrying the S1+S2 combination. The second group 011 corresponds to the addition of S4 and S5. Therefore, the "B7" vertical line also has a serial adder (●) 602 on the horizontal line corresponding to the combination S4+S5. The vertical lines thus join the output of one adder to the input of the next to form an adders string. Thus, having passed through all adders in the string, the result at the end of the string is the product of the vector with one digit-row of one matrix row, the digits in the row being of the same place significance. Vertical line "B8" carries the serial product of greatest place significance, "B7" is a factor 2 less significant, and so on, down to the least significant partial product on line Bo. These shall all now be added with shifts corresponding to their place significance, which is achieved by delaying bits of high significance in delay elements D (D) 600 so they match up with bits of equal significance in the next least significant partial product. The bit streams are LSB first, so later bits of higher significance. After adding the partial products with place-significant shifts, the final output Ro is the dot product of the first matrix row with the input vector. FIG. 7 illustrates the compensation for the addition of 1 to all matrix values by subtracting the sum of all vector values, which is formed by the rightmost vertical line having adders to sum the combination S0+S1+S2 with the combination S3+S4+S5 and then subtracting it from the sum of the partial products delayed one place to implement division by 2 of the compensating value. The result is strictly speaking half the product of a matrix row with the vector, but such scaling is immaterial as long it is known and fixed.

The structure of FIG. 7 is then repeated, with the adder dots (●) 602 in appropriately different positions according to the coefficients of other matrix rows, by adding further sets of 9 vertical lines and a final delay-and-add circuit and compensating subtraction to obtain R1, R2, . . . to $R_M$.

The physical size of the chip structure can be estimated. For example, each group of L bits creates $2^L$ combinations of the input vector values. There are N/L such groups, therefore, the number of horizontal lines is $N.2^L/L-1$.

The number of vertical lines is equal to the product of the number of matrix rows with the number of bits precision of each matrix coefficient. For example, if N=256 and L=8, there are 8,191 horizontal lines, and if the matrix coefficient precision is 9 bits and there are 8,192 matrix rows, there will be 73,728 vertical lines.

Modern semiconductor chips allow 50 nm line-spacing and have, for example, up to ten metal layers. Using only one layer of metallization for the horizontal and vertical lines, 73,728×50 nm=3.7 mm, and the 8,192 horizontal lines occupy 0.4 mm. Thus, the main part of the structure fabricated as FIG. 6 or 7 occupies $0.4\times3.7<1.5\ mm^2$ of chip area to multiply an 8,192×256 matrix to a 256-element vector and obtain an 8,192-element vector result.

In an exemplary 5 nm silicon process, it is conceivable that a feasible serial bit rate through the serial adders is 16 GB/s. The benefit of serial adders is that there is no carry propagation to wait for—that being explicitly built into the carry feedback. Assuming a final word length growth to 32 bits, the circuit can perform one such matrix x vector operation every 2 ns. This is equivalent to over $10^{15}$ fixed-point multiply-accumulates per second.

Figure 8:
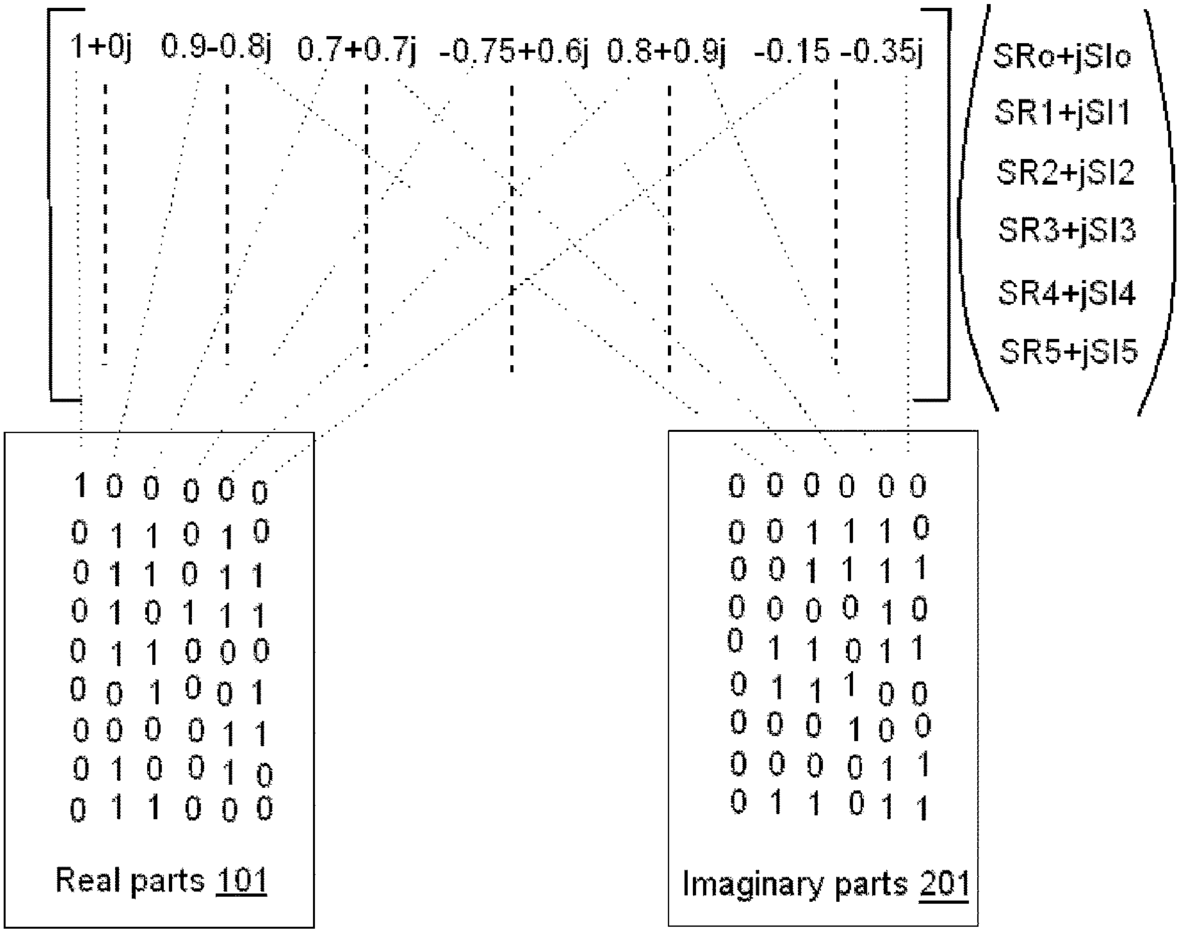
FIG. 8 illustrates an exemplary graph of an exemplary complex-valued matrix multiplied by an exemplary vector in accordance with the present invention.

A structure for the case where all values are complex will now be developed, using FIG. 8. FIG. 8 illustrates the binary expansion of the complex matrix coefficients after adding 1 and dividing by 2 to make all positive. Now the computation must compute:

$$Rr0 = ARo^*SR0 + AR1^*SR1 + AR2^*SR2 + AR3^*SR3 + AR4^*SR4 + AR5^*SR5 - AIo^*SIo - AI1^*SI1 - AI2^*SI2 - AI3^*SI3 - AI4^*SI4 - AI5^*SI5.$$

$$Rio = ARo^*SIo + AR1^*SI1 + AR2^*SI2 + AR3^*SI3 + AR4^*SI4 + AR5^*SI5 + AIo^*SRo + AI1^*SR1 + AI2^*SI2 + AI3^*SR3 + AI4^*SR4 + AI5^*SR5.$$

Figure 9:
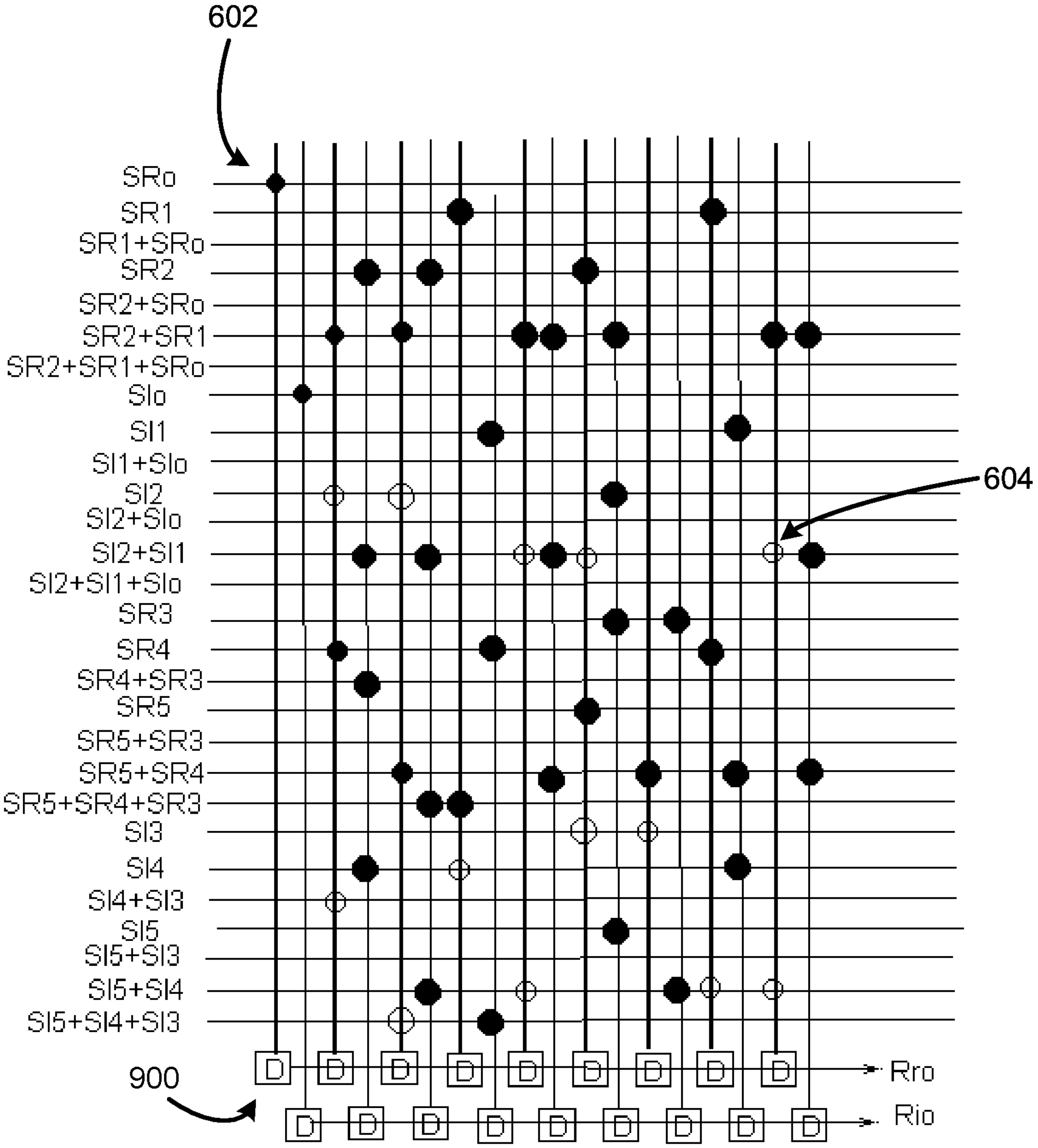
FIG. 9 illustrates the exemplary hardware for the production of an exemplary complex-valued case in accordance with the present invention.

As before, the N bit row corresponding to like-significant bits of the binary expanded real parts (101) is divided into groups of L bits, for example, where N=6 in FIG. 8, L=3, so the six-bit row is divided into two groups of three. This gives rise to combinations of the real parts of the vector (SRo . . . SR5) being needed as previously for the real-valued case. Now the same is done for the binary-expanded imaginary parts (201) and all combinations of the imaginary parts SIo . . . SI5 are computed likewise with a repeat of the structure of FIG. 4. FIG. 9 illustrates how the preformed combinations are then selected for further combination to compute the above expressions for the real and imaginary parts of the first result, Rro and Rio.

In FIG. 9, a solid black dot (●) 602 signifies a serial adder cell (similar to FIG. 7) while an open circle (○) 604 signifies a serial subtractor cell. The only difference between a serial subtractor and a serial adder is that the quantity to be subtracted is logically complemented on input and the carry-in is initialized to 1 rather than 0. Subtractors are necessary to form the real parts that comprise Rro, arising from the formula for the real part of the product of two complex numbers:

Real×Real−Imag×Imag, but only adders are required to form the imaginary part Rio as the imaginary part of a complex product is:

Real×Imag+Imag×Real.

Also, to simplify FIG. 9, the delay and add function is assumed to be combined in the rectangles enclosing a D (D) 900. One string of delay-and-adds combines the real partial products to obtain Rro while a second string of delay-and-adds combines the imaginary partial products to obtain Rio. Subtraction of the sum of all real parts is not shown, but is performed to compensate for the original addition of 1 to all real parts as for the real case, using a vertical line having an adder to combine the precombinations SRo+SR1+SR2 and SR3+SR4+SR5.

Likewise, the final imaginary result is compensated by subtracting the sum of all imaginary vector values formed by a second vertical line having an adder to combine SIo+SI1+SI2 with SI3+SI4+SI5.

It may be mentioned that a "string" of adders in series may beneficially be replaced by a binary tree of adders, in which pairs of values at a time are added in a first rank of adders, then pairs of first rank adder outputs are added in second adders and so forth, the number of adders being the same, but leading to simpler carry-flushing in the serial adder case due to the tree depth being only $Log_2$ of the number of adders. Apart from the latter characteristic these two structures shall be regarded herein as functionally interchangeable.

FIG. 9 suggests an alternate layout where all the vertical real lines for one result computation are grouped together, and likewise the imaginary vertical lines are so grouped adjacently, and not interleaved with the real lines, thereby avoiding crossovers to their respective real and imaginary delay-and-add circuits. A benefit of keeping the real and imaginary part of each result in the same vicinity, however, instead of grouping all real parts for all results Rr0 . . . Rr5 and separately grouping all imaginary results Rio . . . Ri5, is that often the magnitude of each result may need to be computed with a square-root of sum-of-squares operation, the magnitude computation needing both the real and the imaginary result to come together in the magnitude computation. Thus, keeping the real part of a result near its imaginary part reduces tracking should it be desired to compute magnitudes.

In FIG. 9, the delay and add circuits are essentially serial multipliers, and thus analogous to parallel multiplication that might be used in a conventional hardware or software implementation. Instead of delay-and-add, the partial products could be clocked into registers and added with a relative shift. Such a structure would be equivalent to a parallel multiplier in complexity and power consumption. This makes it clear that the invention achieves efficiency by needing only one multiplier-equivalent circuit per output value computed, that is M in the case of an M×M matrix multiplied to an N-element vector, instead of M×N with a conventional approach. Moreover, in the complex case, only 2M multiplier-equivalent circuits are needed instead of the 4M×N that would conventionally be needed, due to a conventional complex multiply requiring four real multiplies (or 3 if Gauss' algorithm is used).

Exemplary embodiments can be used to efficiently implement common algorithms that can be expressed as Matrix×Vector. For example, the Discrete N-point Fourier Transform algorithm (also referred to as a complex Fourier Transform) can be expressed as the multiplication of an N×N complex matrix to an N-element complex vector. As the Fourier Transform Matrix is fixed but the vector to be transformed is variable, the inventive algorithm described herein is appropriate. The DFT would be computed with the equivalent of only 2N real multiply-equivalent operations instead of the $4N^2$ needed for a DFT or the $4N\ \log_2(N)$ real multiplies that are needed with the Fast Fourier Transform. For N=256, this is a factor of 512 times more efficient than the DFT and 16 times more efficient than an FFT. The efficiency gain may translate into lower power consumption when computing a large number of transforms continuously. The chip areas of 1.5 $mm^2$ estimated previously for a 256-in, 8,192-out real matrix multiply becomes 6 $mm^2$ for the complex case. A 256-point Fourier transform engine with 256 in and 256 out is 1/32nd of that size, which is about 0.2 $mm^2$ and performs a transform perhaps every 2 ns.

Although the number base envisioned herein is principally binary, and in some cases ternary, the principle discussed herein is valid for any number base, such as decimal or hexadecimal, although not obviously as efficient for full custom chip implementation.

Accordingly, an exemplary logic structure suitable for chip integration performs multiplication of an M×N matrix of multi-bit values to a vector of N multi-bit values in parallel, yielding all outputs at the same time. The exemplary structure treats a single bit of each element of one row of the matrix at a time, with bits of like significance forming a row of single digits that in the binary case may be regarded as having values of (1 or 0), (1 or −1), or (1, 0, −1). The latter ternary states arise if the matrix row values are in sign-magnitude form. The row of single digits is then multiplied to the multi-bit vector. Since the digits are only +/−1 or 0, no multiplication is involved, and the result is simply sums and differences of the multi-bit vector. The exemplary structure forms all possible sums and differences of groups of the multibit vector elements where a group size L can be smaller than the vector length N to keep the number of sums and differences, which is either $2^L$ or $3^L$ within a reasonable number.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. An integrated circuit comprising a digital logic structure configured for performing an operation of multiplication of an M×N matrix of multi-digit coefficients with an N-element vector of multi-digit values to produce M output values, comprising:

adder trees configured to add L groups of the N vector elements with all possible multiplicative weights combinations, wherein each weight takes on all possible values of a digit in a number base of said multi-digit coefficients of the M×N matrix to produce all possible weighted combinations of a group of L vector values, and wherein a sum of the L groups is equal to N, wherein the weighted combinations representing all possible partial products of the group of L vector values with digits of equal place significance from L corresponding matrix values;

a criss-cross structure of conductors comprising a plurality of parallel conductors in one dimension corresponding to a number of combinations computed by the adder trees for all groups of vector values and a plurality of cross conductors in another dimension, each of the latter joining a set of adder cells in a string to a binary tree, wherein a number of adder strings or trees are equal to a number of real output values to be computed multiplied by a word length in bits of the multi-digit coefficients of the M×N matrix, wherein the adder cells are placed at crossings of the criss-cross structure of conductors to combine partial products for all groups of L vector values, wherein placement of each adder selects a correct partial product for an actual set of L digits of L matrix values in a group, wherein an output of an adder feeding down crossing conductors to an input of a next adder in sequence in a same string or binary tree to obtain a final sum of partial products from a final adder in a string or tree; and a set of delay-and-add or shift-and-add circuits for each of the M output values for combining outputs from final adders of the adder strings or trees taking into account place significance of matrix digits used to compute selected partial products to produce an output value as a product of a matrix row with the N element vector.

2. The integrated circuit of claim 1, wherein the multi-digit values are binary values, and the number base is 2.

3. The integrated circuit of claim 1, wherein the multi-digit coefficients of the M×N matrix are binary and are positive or negative, and wherein the digital logic structure is configured to preconvert the multi-digit coefficients of the M×N matrix to be all positive by adding a largest value in the multi-digit coefficients of the M×N matrix to all.

4. The integrated circuit of claim 1, wherein each of the multi-digit coefficients of the M×N matrix are binary and are positive or negative but with magnitudes less or equal to 1, and wherein the digital logic structure is configured to preconvert the multi-digit coefficients of the M×N matrix to be in a range 0 to +1 by adding 1 to all and dividing by 2.

5. The integrated circuit of claim 1, wherein the digital logic structure is configured to multiply a complex M×N matrix with a complex N-element vector to form M complex results, wherein the digital logic structure is configured to form precombinations of real vector values and separately precombinations of imaginary vector values;

wherein the digital logic structure further comprises strings or binary trees of adders configured to add partial products of real matrix value digits multiplied by real vector parts and to subtract partial products of imaginary matrix value digits multiplied by imaginary vector parts to form a partial product of a real result value, and second strings or trees configured to add partial products of the real matrix value digits multiplied by the imaginary vector parts and to add partial products of the imaginary matrix value digits multiplied by the real vector parts to form a partial product of an imaginary result value; and wherein the digital logic structure is further configured to further combine the respective partial products of real result values and imaginary result values for matrix value digits of different place significance by delay-and-add or shift-and-add operations to account for place significance.

6. The integrated circuit of claim 1, wherein the digital logic structure is configured to perform a fully parallel, N-point complex Fourier Transform using only 2N real-multiplier-equivalent structures.

7. The integrated circuit of claim 1, wherein an adder cell of the set of adder cells comprises a feedback carry delay.

8. The integrated circuit of claim 1, wherein the set of delay-and-add circuits comprise serial multipliers.

9. The integrated circuit of claim 8, wherein the set of shift-and-add circuits comprise registers and are configured to clock the partial products into the registers and add them with a relative shift.

10. The integrated circuit of claim 1, wherein the adder trees comprise adders configured as serial adders.

11. The integrated circuit of claim 10, wherein each of the serial adders are configured to stream in values least significant bit (LSB) first on single lines, and wherein each adder is configured to add two bits plus a carry from its previous addition and to output one bit plus a new carry which is fed back through a delay element to an input of the same adder.

12. The integrated circuit of claim 11, wherein the delay element is a flip flop or an arrangement of switched capacitors.

13. A method of multiplying with a digital logic structure of an integrated circuit, an M×N matrix with a N-element vector to obtain an M-element result, comprising the steps of:

expressing matrix values as a set of place-significance-ordered values in a number base;

grouping digits of like significance of the matrix values in the same row of matrix coefficients to form groups of L digits for adder trees of the digital logic structure;

using the adder trees of the digital logic structure to form precombinations of L vector values to be multiplied by corresponding L matrix values, by multiplicatively weighting and adding, with the adder trees of the digital logic structure, the L vector values using values of digits in a number base as weights, wherein the weights each take on all possible values of a digit in the number base to form partial products of L vector values with a digit of one significance of the corresponding L matrix values;

further combining, with a criss-cross structure of conductors of the digital logic structure, the partial products from different groups of L matrix values and corresponding vector values, wherein the criss-cross structure of conductors comprises a plurality of parallel conductors in one dimension corresponding to a number of combinations computed by the adder trees for all groups of vector values and a plurality of cross conductors in another dimension, each of the latter joining a set of adder cells to a string in a binary tree, wherein the adder cells are placed at crossings of the criss-cross structure of conductors to combine partial products for all groups of L vector values, such that digits of same significance are selected to obtain complete partial products of a row of N like-significant digits of the matrix values with N vector values;

using a set of delay-and-add or shift-and-add circuits of the digital logic structure for each of the M-element result to combine the complete partial products computed from digits of different significance to take account of different place significance to thereby obtain a product of a matrix row with the N-element vector, wherein outputs from final adders of adder strings are combined taking into account place significance of matrix digits used to compute selected partial products; and repeating the above steps for each matrix row to obtain a product of the M×N matrix with the N-element vector.

14. The method of claim 13, wherein the matrix values and the vector values are complex values having a real and an imaginary part.

15. The method of claim 13, wherein the delay-and-add circuits comprise serial multipliers.

16. The method of claim 13, wherein the matrix values and the vector values are used in at least one of Fourier transforms and transmit/receive beamforming calculations.

* * * * *